United States Patent [19]

Lael

[11] Patent Number: 5,207,012
[45] Date of Patent: May 4, 1993

[54] FISHERMAN'S PLIERS

[76] Inventor: Donald M. Lael, 138 Lake Valley, Warrenton, Mo. 63383

[21] Appl. No.: 939,087

[22] Filed: Sep. 2, 1992

[51] Int. Cl.$^5$ .............. A01K 97/00; A01K 97/06
[52] U.S. Cl. .......................... 43/4; 43/54.1; 7/106
[58] Field of Search .............. 43/4, 54.1, 53.5; 30/125, 363; 81/427.5, 424, 428 R; 72/410; 7/106, 127, 128, 129, 132, 158, 168

[56] References Cited

U.S. PATENT DOCUMENTS

| 2,765,687 | 10/1956 | Stanfield | 43/53.5 |
| 2,765,886 | 10/1956 | Deline | 72/410 |
| 2,777,345 | 1/1957 | Reider, Jr. | 81/15 |
| 2,920,514 | 1/1960 | McKeehan et al. | 81/15 |
| 2,931,125 | 4/1960 | Planin | 43/54.1 |
| 3,172,319 | 3/1965 | Stanfield | 72/410 |
| 3,641,654 | 2/1972 | Wheeler | 72/410 |
| 3,930,329 | 1/1976 | Burkhardt | 43/4 |
| 4,238,862 | 12/1980 | Leatherman | 7/128 |
| 4,559,853 | 12/1985 | Oye | 43/53.5 |
| 4,563,833 | 1/1986 | Aucoin | 43/54.1 |
| 4,965,958 | 10/1990 | Cedergreen et al. | 43/55 |

FOREIGN PATENT DOCUMENTS 745375 5/1933 France.
113768 3/1918 United Kingdom.
213812 4/1924 United Kingdom.

Primary Examiner—Kurt C. Rowan
Attorney, Agent, or Firm—Grace J. Fishel

[57] ABSTRACT

A pair of cross jaw pliers with handles and jaws pivoted around a pivot pin with a container in each handle, one for storing and dispensing fishhooks and the other for storing and dispensing split shot sinkers. Both handles have a short bowed section joined to a longer hollow tube portion. The short bowed sections compensate for the lack of curvature in the longer tube portions. Each tube portion is closed with a normally closed valve that is adapted to be opened with finger or thumb pressure to gravity-feed the fishhooks and sinkers. The jaws of the pliers are biased open and have a recess for seating and retaining a split shot sinker and crimping it on a fishing line. The jaws also have longitudinal blades for cutting the fishing line.

7 Claims, 2 Drawing Sheets

FISHERMAN'S PLIERS

BACKGROUND OF THE INVENTION

1. Field of the Invention

A pair of cross jaw pliers with a container in each handle, one for storing and dispensing fishhooks and the other for storing and dispensing split shot sinkers or other miscellaneous small items.

2. Brief Description of the Prior Art

Early in the spring, crappie move into shallow water near shore to feed and spawn. They are found around fallen trees, driftwood or submerged brush. They also hang around pilings, old creeks and channels where it is difficult to cast and reel in a line without snagging. For this reason, crappie fishermen lose a lot of hooks and sinkers and are forever tying on a hook and crimping on a piece of shot. Crappie fishing is often done from a small boat which provides a platform from which the fisherman can reach the trashy areas where crappie are found. Ideally when a crappie fisherman loses his hook and sinker, he could attach new ones from his person without reaching around the boat for necessary tools and materials.

While the above discussion has been focused on crappie fishing from a boat, trout fishermen and fishermen in general who fish from a boat or wade in a stream have similar needs.

There are several pliers with a hollow handle for holding split shot described in issued U.S. patents. Such pliers still require the fisherman to reach for his tackle box or the like for a hook. Insofar as known, no one has provided the tools and materials necessary to carry and attach a new hook and a new sinker in a form that can be worn on the user's person.

SUMMARY OF THE INVENTION

In view of the above, it is an object of the present invention to provide the tools and materials necessary for carrying and attaching a new hook and a new sinker to a fishing line or leader in a form that can be carried in a sheath or the like. Another object is to provide a special pair of fisherman's pliers with a hollow handle for fishhooks and a hollow handle for sinkers, each of which has spring biased closure means that can be opened with the forefinger or thumb of one hand, while the hook or sinker is dispensed under force of gravity into the fingers or palm of the other hand. Still another object is to provide a special pair of pliers that can be used to cut the line for attachment of the hook and used to crimp the shot on the line. Other objects and features of the invention will be in part apparent and in part pointed out hereinafter.

In accordance with the invention, a pair of cross jaw fisherman's pliers is provided. Each member of the pliers has a handle and jaw at opposite ends thereof and is pivoted together about a pin located between the handle and the jaw. In a preferred embodiment, there is a resilient biasing means for urging the jaws towards an open position.

The jaws are relatively narrow and have a terminal end and a pivotal end. The terminal ends of each jaw are planar and have a recess with the recesses on opposing jaws being aligned for seating and retaining a split shot sinker and crimping it closed on a fishing line. In the preferred embodiment, each jaw also has a notch between the pivotal end and the terminal end which forms a longitudinally extending blade. The blades on opposing jaws are aligned for cutting the fishing line.

The handles are relatively elongated and have a terminal end and a pivotal end. Each of the handles has a relatively short bowed portion at its pivotal end joined to a relatively long straight hollow tube portion. Each of the tube portions are adapted to form a container for storing split shot sinkers and fishhooks. Each of the tube portions are open at the terminal end of the handle and closed where the tube portion joins the bowed portion of the handle. A valve for closing the hollow tube portion at the terminal end of the handle is provided along with resilient biasing means for urging the valve towards a closed position. Each of the resilient biasing means for closing the valve is adapted to be opened under finger pressure from a user's one hand while the split shot sinkers and fishhooks are gravity-fed into the user's other hand.

The invention summarized above comprises the constructions hereinafter described, the scope of the invention being indicated by the subjoined claims.

BRIEF DESCRIPTION OF THE DRAWINGS

In the accompanying drawings, in which one of various possible embodiments of the invention is illustrated, corresponding reference characters refer to corresponding parts throughout the several views of the drawings in which.

DETAILED DESCRIPTION OF THE INVENTION

Figure 1:
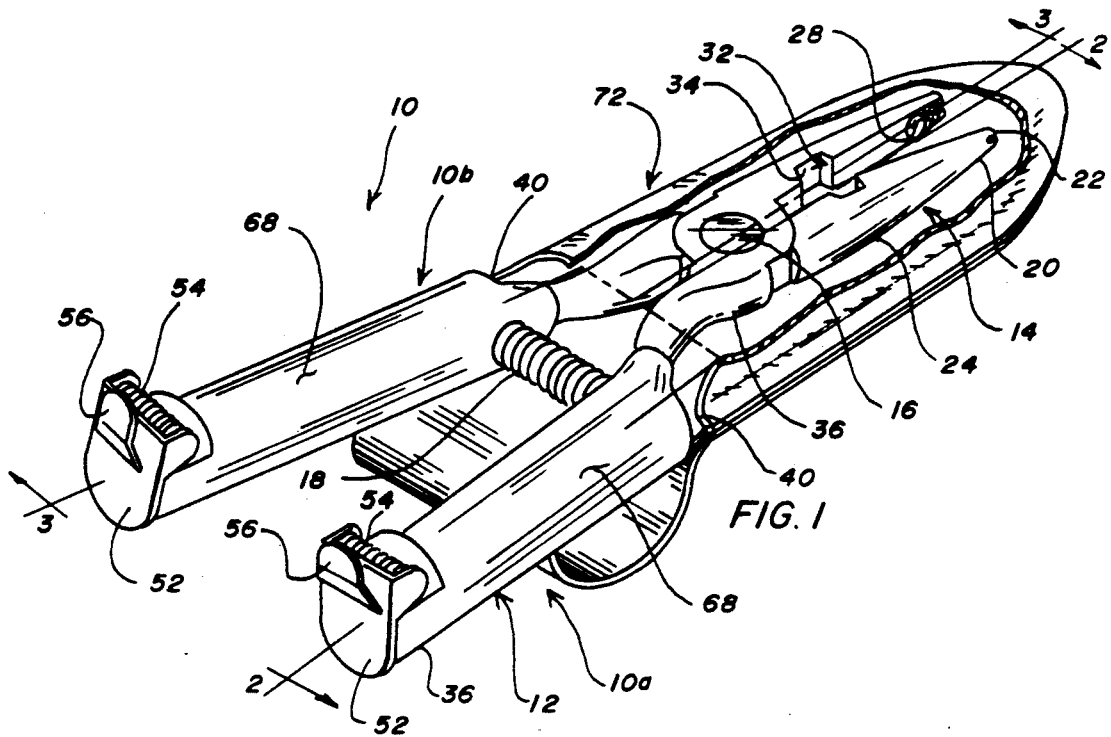
FIG. 1 is a perspective view of a pair of cross jaw fisherman's pliers in accordance with the present invention.

Referring to the drawings more particularly by reference character, reference numeral 10 refers to a pair of cross jaw fisherman's pliers in accordance with the present invention. Pliers 10 are of the kind where each member 10a, 10b thereof has a handle 12 and a jaw 14 at opposite ends thereof. Each of members 10a, 10b is apertured for mounting on a pivot pin 16 at a point between handle 12 and jaw 14 for limited rotation about a longitudinal axis running through the pivot pin.

A first resilient biasing means 18 is provided for urging jaws 14 towards an open position for facile use of pliers 10 in crimping on shot or in cutting line as more particularly described below. First resilient biasing means 18 are illustrated as a coil spring in FIG. 1 but a leaf spring, rubber bumper or the like could be used as will occur to one skilled in the art.

Jaws 14 are relatively narrow with a terminal end 20 (ending in a nose 22) and a pivotal end 24. A notch 26 is provided on nose 22 to facilitate dislodging a fishhook from the mouth of a fish. Terminal ends 20 are planar and have a recess 28 near nose 22. The recesses on opposing members 10a, 10b may be part-spherical and are aligned for seating and retaining a split shot sinker 30 and crimping it closed on a fishing line. Each jaw 14 also has a notch 32 that forms a longitudinally extending blade 34. Blades 34 on opposing members 10a, 10b are aligned and preferably spaced a distance from pivotal end 24 for use in cutting line.

Handles 12 are longer than jaws 14 (i.e., relatively elongated with respect to) and have a terminal end 36 and a pivotal end 38. Each of handles 12 has a short bowed portion 40 at its pivotal end 38 joined to a longer (i.e., relatively longer) straight hollow tube portion 42. Bowed portion 40 is curved to compensate for the lack of curvature in tube portion 42 such that handles 12 can be gripped in a user's hand 44 without the possibility of crushing his fingers 46 or thumb 48 between the handles. Bowed portions 40 are preferably solid.

Figure 4:
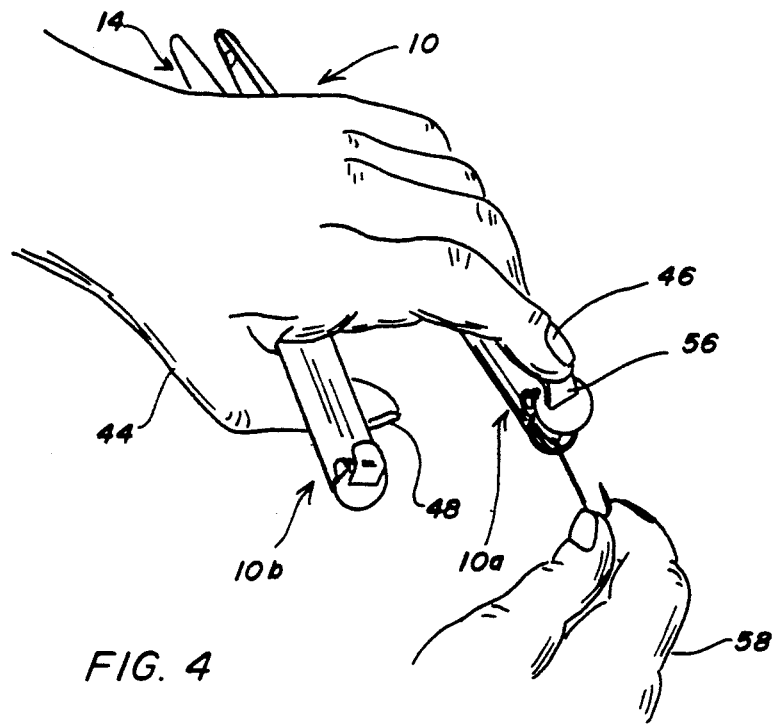
FIG. 4 is a perspective view of the pliers being gripped in one hand by a user and gravity feeding a fishhook into the user's other hand; and, FIG. 5 is a perspective view of the pliers being gripped in one hand by a user and gravity feeding a split shot sinker into the user's other hand.
Figure 5:
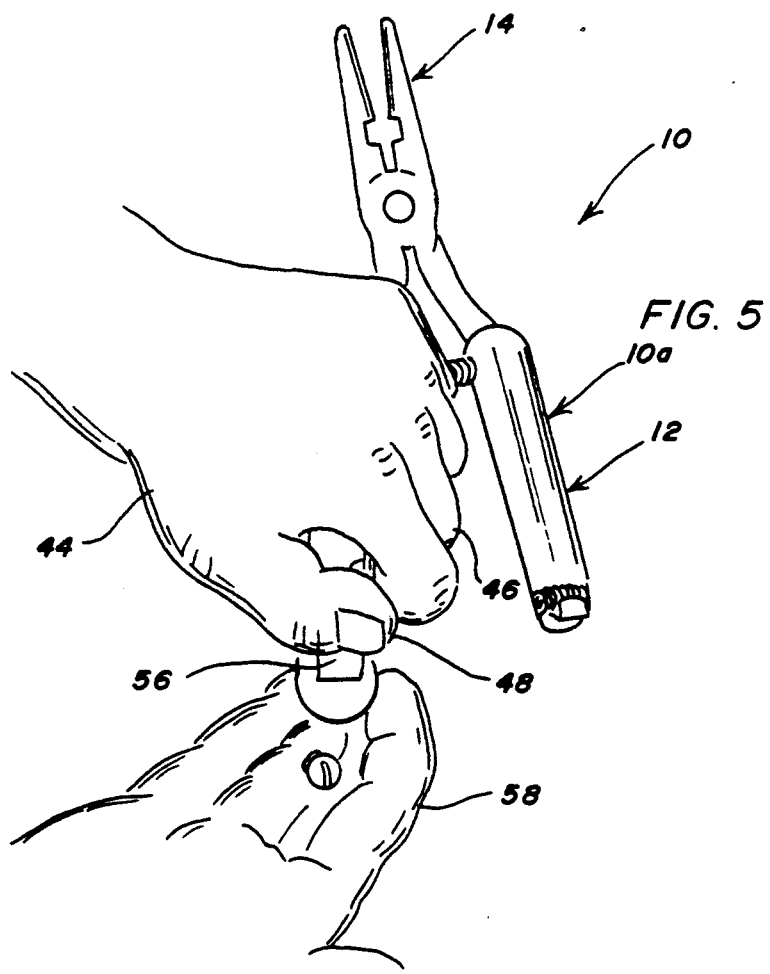

Hollow tube portions 42 are adapted to form a container for storing split shot sinkers 30 and fishhooks 50 with split shot in one container and fishhooks in the other. Each of tube portions 42 is open at terminal end 36 of handle 12 and closed where the tube portion joins bowed portion 40. A valve 52 for closing tube portion 42 is provided at terminal end 36 of handle 12. A second resilient biasing means 54 is mounted on handle 12 and urges valve 52 towards a closed position. In the drawings, valve 52 and second resilient biasing means 54 are shown in form of a spring cap but other functionally similar arrangements are considered part of the present invention. Valve means 52 includes a lever arm 56 or is otherwise adapted to be opened under finger pressure from user's fingers 46 (as shown in FIG. 4) or thumb 48 (as shown in FIG. 5) while fishhooks 50 and split shot sinkers 30 are gravity-fed into a user's other hand 58.

Figure 2:
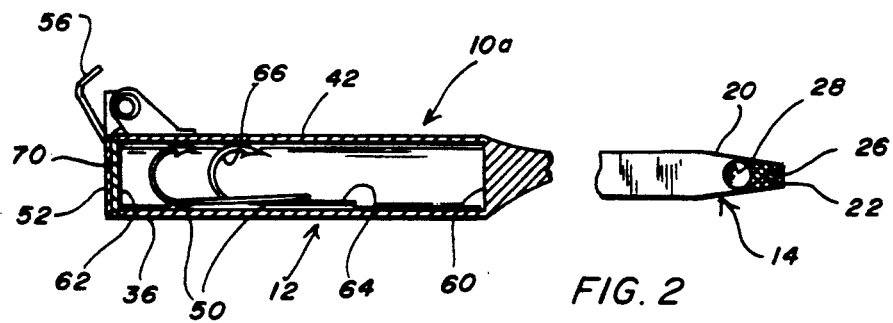
FIG. 2 is an offset sectional view taken along line 2—2 in FIG. 1.
Figure 3:
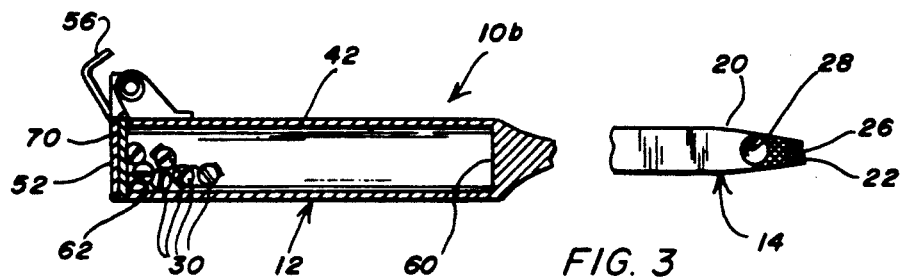
FIG. 3 is an offset sectional view taken along line 3—3 in FIG. 1.

As shown in FIGS. 2–3, it is preferred that tube portion 42 be closed at one end with a flat bottom 60 where tube portion 42 joins bowed portion 40. Valve 52 is also preferably flat 62 to minimize the chances that fishhooks 50 and sinkers 30 will catch in the container. Fishhooks 50 are preferably stored in tube portion 42 with their shank end 64 towards flat bottom 60 and hook end 66 towards valve 52 to prevent tangling. It will also be noted that the inside diameter of tube portion 42 is not greatly larger than the width of hook end 66 to prevent tangling.

Handles 12 and valve 52 are preferably coated with a water repellant, gripable coating 68 which may be applied by dipping or the like. A gasket 70 is also provided between the open end of tube portion 42 and valve 52 for sealing the container closed against moisture.

Pliers 10 shown in the drawings are approximately 7½ inches (19 cm) long and provide a convenient and very workable device for use by most men. It will be understood, however, that pliers 10 can be made smaller for use by women or children or larger if needed.

In use, tube portions 42 are filled with suitable small items such as split shot sinkers 30 and fishhooks 50 and pliers 10 stored in a sheath 72 carried on the user's belt or clipped to his clothes. Alternatively, pliers 10 can be carried in one of the user's pockets in his pants, shirt, vest, coat or the like. When the user loses his fishhook or sinker from his line, he simply pulls pliers 10 out of sheath 72 or his pocket. Pliers 10 can then be used to trim the fishing line, gravity-feed the required split shot sinker 30 or fishhook 50 into his hand 58 and crimp the sinker onto his line. All of this can be accomplished without reaching down and rummaging through a tackle box. In addition to making the operation less frustrating, the user increases his chances for catching a fish by getting his line back in the water faster which is an important advantage in tournament fishing.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A pair of cross jaw fisherman's pliers, each member of which has a handle and a jaw at opposite ends thereof pivoted together about a pin between said handle and said jaw, said jaws being relatively narrow and having a terminal end and a pivotal end, the terminal ends of each jaw being planar and having a recess, said recesses on the opposing jaws being aligned for seating and retaining a split shot sinker and crimping it closed on a fishing line, said handles being relatively elongated and having a terminal end and a pivotal end, each of said handles having a relatively short bowed portion at its pivotal end joined to a relatively long straight hollow tube portion, each of said tube portions adapted to form a container for storing split shot sinkers and fishhooks, each of said tube portions being open at the terminal end of the handle and closed where the tube portion joins the bowed portion of the handle, a valve for closing the hollow tube portion at the terminal end of the handle and a resilient biasing means for urging the valve towards a closed position, each of said resilient biasing means for urging the valve closed adapted to be opened under finger pressure from a user's one hand while the split shot sinkers and fishhooks are gravity-fed into the user's other hand.

2. The pliers of claim 1 wherein the tube portion is closed at one end with a flat bottom where the tube portion joins the bowed portion and at its opposite end with a flat valve to minimize the chances that the sinkers and fishhooks will catch in the container.

3. The pliers of claim 1 wherein the resilient biasing means for urging the valve closed has a lever arm for opening the valve with the forefinger or thumb of one hand.

4. A pair of cross jaw fisherman's pliers, each member of which has a handle and a jaw at opposite ends thereof pivoted together about a pin between said handle and said jaw and a first resilient biasing means for urging the jaws towards an open position by applying a force on said handles, said jaws being relatively narrow and having a terminal end and a pivotal end, the terminal ends of each jaw being planar and having a recess, said recesses on the opposing jaws being aligned for seating and retaining a split shot sinker and crimping it closed on a fishing line, each jaw having a notch between the pivotal end and the terminal end forming a longitudinally extending blade, said blades on the opposing jaws being aligned for cutting the fishing line, said handles being relatively elongated and having a terminal end and a pivotal end, each of said handles having a relatively short bowed portion at its pivotal end joined to a relatively long straight hollow tube portion, each of said tube portions adapted to form a container for storing split shot sinkers and fishhooks, each of said tube portions being open at the terminal end of the handle and closed where the tube portion joins the bowed portion of the handle, a valve for closing the hollow tube portion at the terminal end of the handle and a second resilient biasing means for urging the valve towards a closed position, each of said second resilient biasing means for urging the valve closed having a lever arm for opening the valve under finger pressure from a user's one hand while the split shot sinkers and fishhooks are gravity-fed into the user's other hand.

5. The pliers of claim 4 wherein the tube portion is cylindrical and is closed at one end with a flat bottom where the tube portion joins the bowed portion and its opposite end with a flat valve to minimize the chances that the sinkers and fishhooks will catch in the container.

6. The pliers of claim 5 wherein the outer surface of the handle and the valve is coated with a water repellant, nonslip covering.

7. The pliers of claim 6 wherein the valve has a gasket for sealing the container closed.

* * * * *